United States Patent
Gardes et al.

(10) Patent No.: US 9,113,193 B1
(45) Date of Patent: Aug. 18, 2015

(54) VIDEO CONTENT ITEM TIMELINE

(71) Applicant: Cisco Technology Inc., San Jose, CA (US)

(72) Inventors: Laurent Gardes, Meudon (FR); Didier De Marrez, Charenton-le-Pont (FR); Yann Prat, Elancourt (FR); Natalie Lehoux, Saint Cyr l'Ecole (FR); Sarah Pietrasik, Annecy-le-Vieux (FR)

(73) Assignee: CISCO TECHNOLOGY INC., San Jose, CA (US)

( * ) Notice: Subject to any disclaimer, the term of this patent is extended or adjusted under 35 U.S.C. 154(b) by 0 days.

(21) Appl. No.: 14/331,542

(22) Filed: Jul. 15, 2014

(51) Int. Cl.
| | |
|---|---|
| *H04N 9/80* | (2006.01) |
| *H04N 21/431* | (2011.01) |
| *H04N 21/41* | (2011.01) |
| *H04N 21/4143* | (2011.01) |
| *H04N 21/433* | (2011.01) |
| *H04N 21/44* | (2011.01) |
| *H04N 21/4722* | (2011.01) |
| *H04N 21/81* | (2011.01) |
| *G06F 3/01* | (2006.01) |

(52) U.S. Cl.
CPC ............ *H04N 21/4312* (2013.01); *G06F 3/017* (2013.01); *H04N 21/4113* (2013.01); *H04N 21/4126* (2013.01); *H04N 21/4143* (2013.01); *H04N 21/4332* (2013.01); *H04N 21/44008* (2013.01); *H04N 21/4722* (2013.01); *H04N 21/812* (2013.01); *H04N 21/8153* (2013.01)

(58) Field of Classification Search
None
See application file for complete search history.

(56) References Cited

U.S. PATENT DOCUMENTS

| | | | |
|---|---|---|---|
| 2011/0072037 A1* | 3/2011 | Lotzer ........................... | 707/769 |
| 2014/0068670 A1* | 3/2014 | Timmermann et al. ......... | 725/40 |

OTHER PUBLICATIONS

Michael Grothaus, "How Interactive Product Placements Could Save Television," (Jul. 25, 2013).
"Introducing Xbox SmartGlass," (Microsoft 2014).
"Shopping Mode with Timeline," (2014).
"The World's First Platform to Explore and Shop From Videos You Love," (Cinematique 2013).

* cited by examiner

*Primary Examiner* — Heather Jones
(74) *Attorney, Agent, or Firm* — Hahn Loeser & Parks LLP

(57) ABSTRACT

In one embodiment, a method includes: querying a database for data related to a video content item currently being displayed on a display device, the video content item comprising at least one of video scene; receiving the data upon identifying the video content item in the database, the data comprising metadata relevant to one or more promoted objects appearing in the at least one of video scene; and displaying, on the display device, a graphical timeline of the video content item generated using the metadata, wherein the graphical timeline comprises an interactive visual indication and an interactive thumbnail for each of the one or more promoted objects appearing in the at least one of video scene, the interactive visual indication identifying a particular promoted object from the one or more promoted objects and the interactive thumbnail identifying a video scene of the video content item in which the particular promoted object appears.

18 Claims, 10 Drawing Sheets

VIDEO CONTENT ITEM TIMELINE

FIELD OF THE INVENTION

The present disclosure generally relates to methods and apparatus to display and operate a graphical timeline representation of a video content item.

BACKGROUND OF THE INVENTION

Social television creates a need and opportunity for interaction between the sender and content consumers. This involves new services, applications and changes in content production. The use of a second screen provides a parallel path, whereby the user can become an active agent in the broadcast content or another activity, rather than interrupt playback. Nowadays, the use of a second screen application to enhance the television (TV) viewing experience has become a current practice.

The second screen refers to the use of a computing device (commonly a mobile device, such as a tablet or smartphone) for which applications are designed to give another form of interactivity to the user and another way to sell advertising content. Some examples of such applications include: TV programs broadcast live tweets and comments; synchronization of audiovisual content; additional content information; games; TV program recommendations; electronic program guide; remote controlling; music identification; etc.

BRIEF DESCRIPTION OF THE DRAWINGS

The present invention will be understood and appreciated more fully from the following detailed description, taken in conjunction with the drawings in which.

DESCRIPTION OF EXAMPLE EMBODIMENTS

Glossary

Video scene: A part of a video content item in which a particular action or activity occurs.

Promoted object: An object, appearing in a video content item or in a video scene of a video content item, for which further information are available and may be accessed. Examples of promoted objects are electronic device(s), clothes, furniture, car(s), accessories, etc.

Graphical timeline: A graphical user interface relevant to a video content item enabling a user to navigate through the video content item and to access further information on one or more promoted objects. A graphical timeline may include: one or more visual indications identifying one or more promoted objects appearing in the video content item and/or in a video scene of the video content item; and one or more thumbnails identifying a video scene of the video content item in which one or more promoted objects appear.

Description page: A graphical user interface relevant to a particular promoted object and providing a user with detailed information on the particular promoted object. Common examples of detailed information for a particular promoted object are product description, price, store location, a network address, etc.

User interface (UI) gesture: A gesture used by a user to input a command to an operating system and/or application running on a computing device. UI gestures are typically entered by one or more of the user's fingers coming in contact or at least close proximity with a touchscreen associated with the computing device. Common examples of UI gestures are swipes, pinches-in/-out, taps and double taps.

Overview

In one embodiment, a method includes: querying a database for data related to a video content item currently being displayed on a display device, the video content item comprising at least one of video scene; receiving the data upon identifying the video content item in the database, the data comprising metadata relevant to one or more promoted objects appearing in the at least one of video scene; and displaying, on the display device, a graphical timeline of the video content item generated using the metadata, wherein the graphical timeline comprises an interactive visual indication and an interactive thumbnail for each of the one or more promoted objects appearing in the at least one of video scene, the interactive visual indication identifying a particular promoted object from the one or more promoted objects and the interactive thumbnail identifying a video scene of the video content item in which the particular promoted object appears.

DETAILED DESCRIPTION OF EXAMPLE EMBODIMENTS

Figure 1:
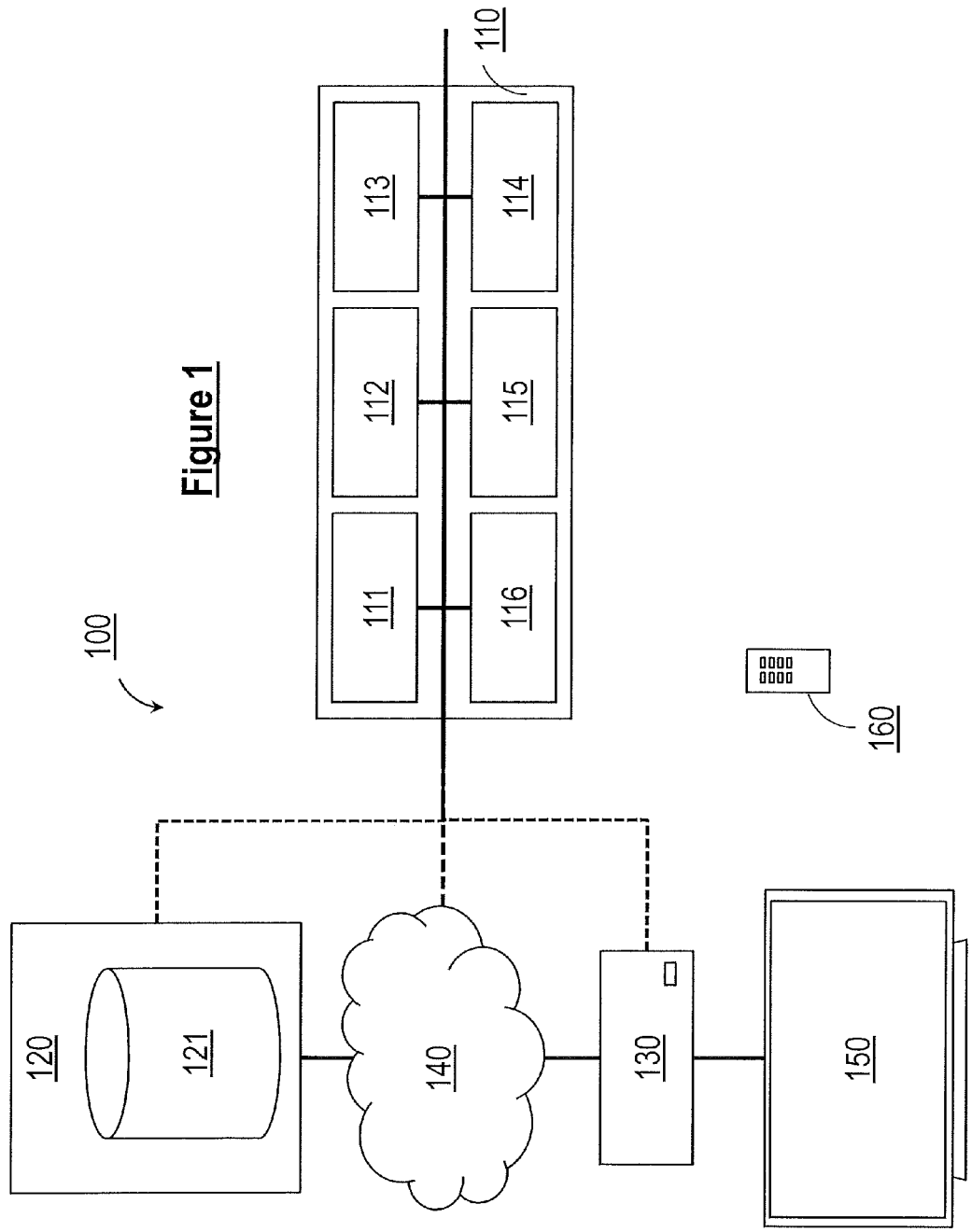
FIG. 1 is a simplified block diagram illustration of a system constructed and operative in accordance with an embodiment of the present invention.

Reference is now made to FIG. 1 which is a simplified block diagram illustration of a system constructed and operative in accordance with an embodiment of the present invention.

FIG. 1 shows a headend 120 which typically communicates with a plurality of client devices 130 via a communication network 140. Additionally or alternatively, a plurality of headends 120 may communicate with a single client device 130 or with a plurality of client devices 130 via the communication network 140. For simplicity of depiction and description, but without limiting the generality of the invention, only one client device 130—headend 120 communication is illustrated in FIG. 1.

The communication network 140 is a one-way or two-way communication network that includes at least one of the following: a satellite based communication network; a cable based communication network; a conventional terrestrial broadcast television network; a telephony based communication network; a telephony based television broadcast network; a mobile-telephony based television broadcast network; an Internet Protocol (IP) television broadcast network; or a computer based communication network. It is appreciated that in alternative embodiments of the present invention, the communication network 140 may, for example, be implemented by one-way or two-way hybrid communication network, such as a combination cable-telephone network, a combination satellite-telephone network, a combination satellite-computer based communication network, or by any other appropriate network. Other ways of implementing the communication network 140 will be apparent to someone skilled in the art.

The system of FIG. 1 comprises a client device 130 disposed between a headend 120 and a display device 150. Client device 130 comprises a digital video recorder (DVR) that typically includes a high capacity storage device, such as a hard disk or high capacity memory. Client device 130 typically comprises at least one: tuner, demultiplexer, decoder, receiver, descrambler, processor and memory. Further, the client device 130 may comprise various communications interfaces such as, but not limited to, Internet Protocol network, satellite, cable interfaces, etc. It is appreciated that the client device 130 also comprises other standard hardware and software components as is well known in the art.

Client device 130 is typically connected in operation to display device 150 via a digital interface (e.g. HDMI, DVI, etc.) or via an analogue audio video interface (e.g. component (RGB, YPbPr), composite (NTSC, PAL, SECAM), S-video, SCART, RF coaxial, D-terminal (D-tanshi), etc.). Although shown as separate entities in FIG. 1 and the previous paragraph, the client device 130 may be integral with the display device 150 in other embodiments of the present invention.

Client device 130 typically receives, demultiplexes, decodes and decrypts/descrambles as necessary a broadcast television stream received from a headend 120 optionally under the control of a conditional access device such as a removable security element as is well known in the art. The output from the client device 130 comprises a decoded and decrypted/descrambled as necessary AV stream ready to be displayed on the display device 150.

Display device 150 is typically operated by a user, for example via a remote control unit (RCU) 160. Using a RCU 160, a user can select an AV content to view, such as a live event broadcast, a video-on-demand (VOD) asset, a recorded event, etc. The operating system software within client device 130 monitors user interaction with display device 150 and/or client device 130 and maintains a database of service and event information. The operating system software enables the user to choose an event/service to view.

Furthermore, an electronic device 110 is provided that is operable to communicate with the client device 130 using any suitable connectivity link (e.g. wireless connection over Internet Protocol). The electronic device 110 is further operable to communicate with the headend 120 through the communication network 140. FIG. 1 shows only one communication network 140. However, those skilled in the art will appreciate that the electronic device 110 may communicate directly with the headend 120 using the same or a different communication network 140. The electronic device may be, for example, but without limiting the generality of the present invention, a laptop computer, a desktop or personal computer (PC), a tablet computer such as an iPad™, a mobile computing device, such as a Personal. Digital Assistant (PDA), mobile phone, or any other suitable handheld device. Electronic device 110 typically comprises a rendering screen 111, a video player 112, a memory 113, a storage device 114, a processor 115 and a communications unit 116. It is appreciated that the electronic device 110 comprises standard hardware and software components as is well known in the art.

The rendering screen 111 of the electronic device 110 may be any appropriate display or screen suitable to display AV data and/or data information either retrieved from an external source or stored in one of the memories 113-114 (e.g. AV data received from the headend 112 and/or client device 130, data information retrieved from the Internet or stored in one of the memories 113-114, etc.). The rendering screen 111 may also be a touch sensitive display thereby enabling a user to control and/or interact with the contents (e.g. AV data, data information, etc.) displayed on the rendering screen 111.

Similarly, the video player 112 may be any suitable video player allowing different types of AV data to be played on the electronic device 110. For instance, but without limiting the generality of the present invention, the video player 112 may be able to play AV data received from the client device 130 and/or directly from the headend 120 (e.g. VOD asset, live or recorded program, etc.), retrieved from any suitable external source (e.g. video file downloaded or streamed from the Internet, etc.) and/or already stored in one of the memories 113-114 of the electronic device 110.

The electronic device 110 also comprises a memory 113, such as a random access memory (RAM) or other dynamic storage device (e.g. dynamic RAM, static RAM, synchronous RAM, etc.) coupled to a communications bus for storing information and instructions to be executed by the processor 115. Additionally, the memory 113 may be used to store temporary variables and/or other intermediate information during the execution of instructions by processor 115. It will be appreciated by those skilled in the art that the memory 113 may be a single memory or split into a plurality of memories. For example, a further memory may be provided such as a read only memory (ROM) or any other static storage (e.g. programmable ROM, erasable programmable ROM, and electrically erasable programmable ROM, etc.) coupled to the bus for storing static information and instructions for the processor 115. The electronic device 110 further comprises a storage device 114 such as a magnetic hard disk, or a removable media drive (e.g. floppy disc drive, read-only compact disc drive, read/write compact disc drive, compact disc jukebox, tape drive, and removable magneto-optical drive), etc. coupled to the bus for storing other AV data, data information and/or instructions.

The electronic device 110 further includes a processor 115 operable to process any command received from a user operating the electronic device 110 and/or received at the communications unit 116 (e.g. from the headend 120, the client device 130, a remote source via the communication network 140, etc.). In response to a received command, the processor 115 retrieves the relevant set(s) of instructions from one of the memories 113-114 and executes it (them).

The electronic device 110 also includes a communications unit 116 coupled to the bus. The communications unit 116 is a communication interface providing a two-way communication coupling enabling the electronic device 110 to exchange any type of AV data and/or data information the client device 130, the headend 120, or any other external source. The communications unit 116 is further operable to pass this data to the processor 115 for further processing and/or to the video player 112 for playback. Also, the communication unit 116 is able to receive any additional data information from a further device. For example, a personal computer (PC), a laptop computer, a handheld device, etc. may be connected to the electronic device 110 to exchange data information. Also, the electronic device 110 may be connected to any type of network (e.g. intranet, Internet, Wide Area Network, Local Area Network, etc.) or servers (e.g. internal, remote, external servers, etc.) thereby being able to exchange additional data information. Therefore, the communication unit 116 is operable to exchange (e.g. transmit and receive) any suitable type of AV data and/or data information with a plurality of devices coupled to the electronic device 110.

In the above description of FIG. 1, the different blocks are set forth in order to provide a thorough understanding of the various principles of the present invention. However, those skilled in the art will appreciate that not all these details are necessarily always required for practicing the present invention or limited to this particular configuration. In this instance, well-known circuits, control logic, and the details of computer program instructions for conventional algorithms and processes have not been shown in detail in order to not obscure the general concepts unnecessarily. Furthermore, the different components which are, for clarity, described separately may also be provided in combination in a single component. Conversely, various components of the invention which are, for brevity, described in a single component may also be provided separately.

While watching an event and/or a service on the display device 150, a user of the system 100 may decide or may be invited to run an application on his electronic device 110. The application is installed in advance on the electronic device 110 and typically comprises a plurality of set of instructions that are stored in one of the memories 113-114. The application may be locally executed on the electronic device 110 thereby enabling communication with the client device 130 and/or the headend 120. Once launched, the application is able to playback a customized version of the event and/or service currently being displayed on the display device 150 on the electronic device 110. This customized version typically enables a user to get more information on promoted objects appearing in the different scenes of the event/service. A promoted object may be any object appearing in a particular event such as, but not limited to, electronic device(s), clothes, furniture, car(s), accessories, etc. Also, a graphical user interface (hereinafter referred as a graphical timeline) relevant to the event and/or service currently being displayed on the display device 150 is built and provides the user with a simplified way to navigate through the event and/or service to access information on the different promoted objects. Typically, upon identification of the event and/or service currently being displayed on the display device 150, the electronic device 110 queries a database 121 located at the headend premises and receives in response data comprising:

AV data corresponding to the event currently being displayed on the display device 150; and metadata relevant to the promoted objects and/or to the event currently being displayed on the display device 150.

Hence, the retrieved AV data can be played back on the electronic device 110 and some of the retrieved metadata are used to identify the different promoted objects in the AV data. Identifying the promoted objects typically includes displaying visual indications on top of the AV data whenever a promoted object appears. Furthermore, the visual indications are interactive thereby enabling a user of the electronic device 110 to access detailed information on a particular promoted object such as, but not limited to, price, store location, object description, etc. Also, some of the retrieved metadata are used to build a graphical timeline of the AV data showing the different promoted objects. Once built, a user of the electronic device 110 can display and browse the graphical timeline to get more information related to the different promoted objects. Displaying such a graphical timeline enables a user to access information on promoted objects at any time and not only at the time when the promoted objects appear in the event/service currently being displayed on the display device 150. Although described as being generated and displayed on the electronic device 100, those skilled in the art will appreciate that the graphical timeline may be generated by the client device 130, by the headend 120 or even at remote server/source. In the latter case, the graphical timeline is transmitted to the electronic device 110 as part of the data. Additionally and/or alternatively, the AV data being played back as well as the generated graphical timeline may be displayed on the display device 150. In such a situation, a first area of the display device 150 may be defined and used to display the event while a second area may be defined and used to display the AV data as well as the graphical timeline. The display device 150 may, for example, but without limiting the generality of the invention, be:

a rendering screen of an electronic device (e.g. tablet computer) divided into two areas: a first one used to display the event and a second one to display the AV data and/or the graphical timeline. These two areas may be overlapping and implemented as a picture-in-picture window; or a large display (e.g. enabled by thin or no-bezel tile-able panel technology—i.e. the large display could comprise one or more displays—, or high-resolution projectors, etc.) divided into a plurality of areas: a first area being at least used to display the event and a second area being at least used display the AV data and/or the graphical timeline; etc.

Other ways of displaying the event, the AV data and/or the graphical timeline will be apparent to those skilled in the art.

Figure 2:
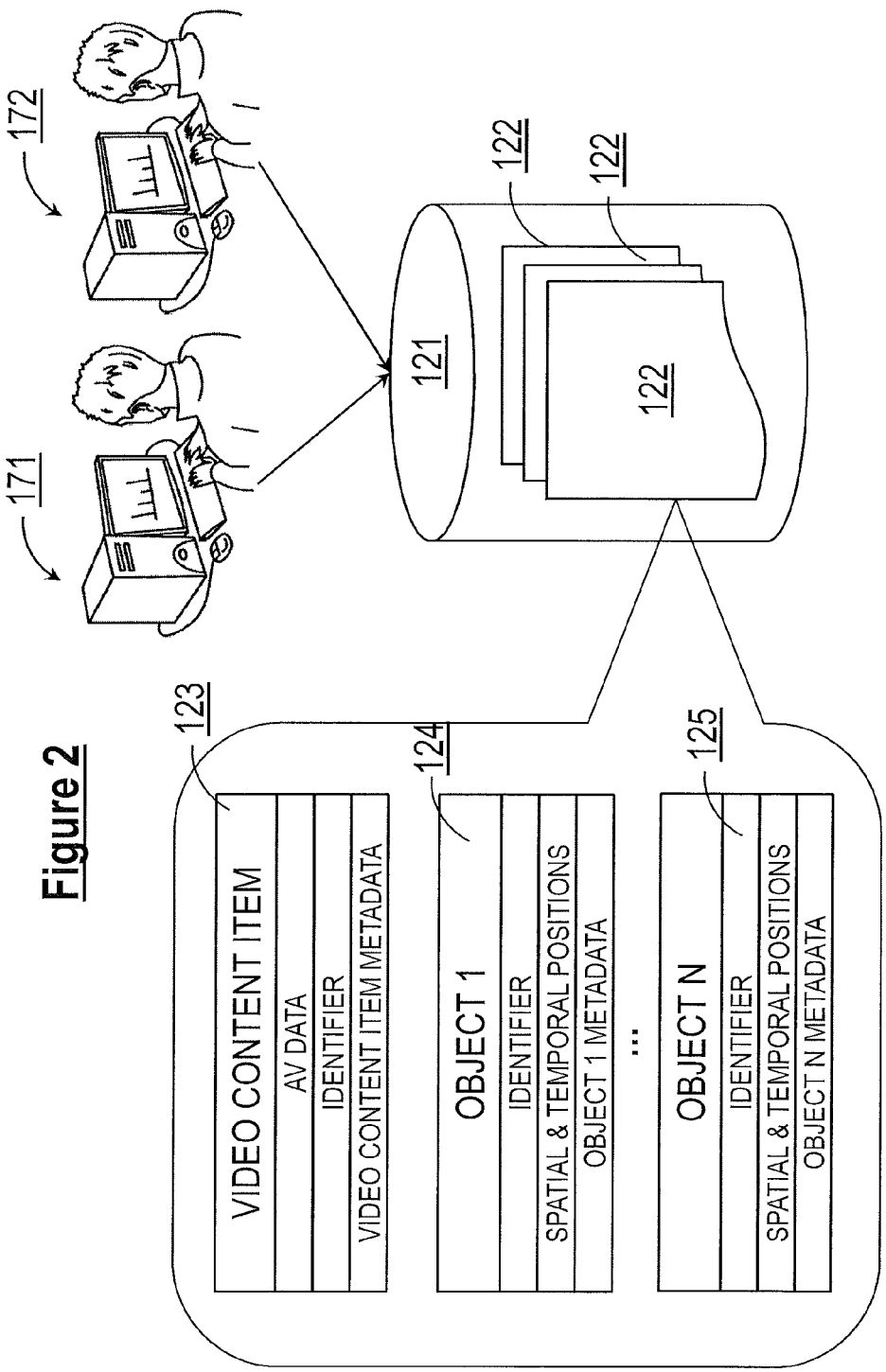
FIG. 2 is a simplified block diagram illustration of a headend database in the system of FIG. 1.

Reference is now made to FIG. 2, which is a simplified block diagram illustration of a headend database constructed and operative in accordance with an embodiment of the present invention.

The database 121 is typically located at the headend 120 and comprises AV data as well as metadata related to a plurality of video content items 122. Although shown as located at the headend 120, those skilled in the art will appreciate that the database 121 may be located in any suitable component of the system 100 of the present invention or may even be external to the system 100 (e.g. remote source). Other ways of implementing the database 121, such as using a plurality of databases located in the headend 120 or even at a remote site, or a combination of both the headend and the remote site, will be apparent to someone skilled in the art.

The database 121 typically comprises a plurality of video content items 122. The video content items 122 which populate the database 121 and their associated metadata may be selected and provided by a TV broadcaster, a platform operator, a content provider or any third party entity. Hence, a wide selection of regular TV broadcast events, VOD assets, and other video content items may be available to the end user. For example, a television platform and/or operator 171 may specify which video content items 122 are to be made available to the end users. Additionally and/or alternatively, a third party 172 (e.g. advertisers, product/object seller, etc.) may also specify video content items 122 to include in the database 121. In this latter case, the third party 170 has typically some products or objects appearing in one or more content items 122 and has therefore a commercial interest in making them available through the database 121.

In an embodiment of the present invention, each video content item 122 present in the database 121 includes data

Figure 3:
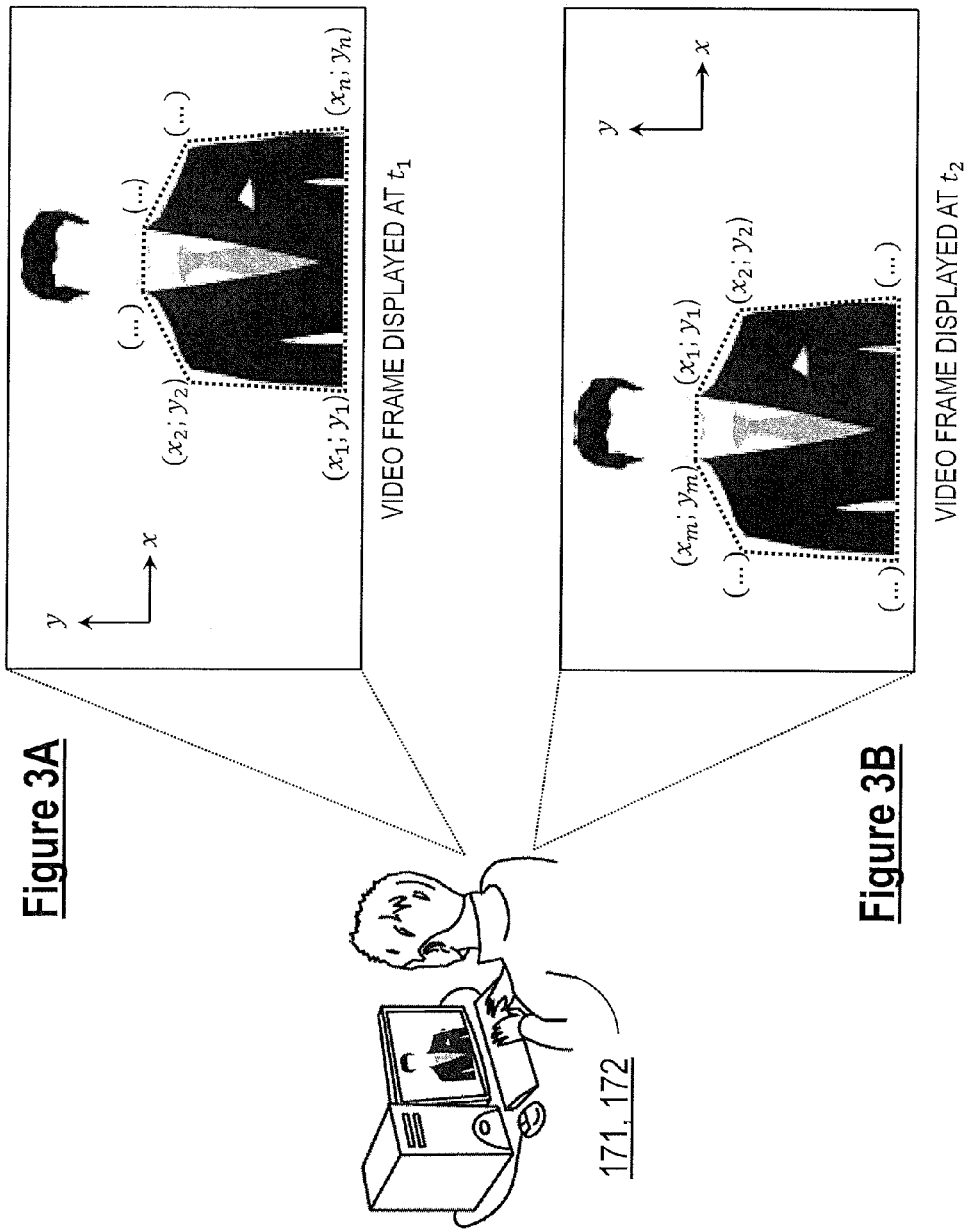
FIGS. 3A and 3B are pictorial illustrations showing how a video content item is prepared prior to being stored in a database in accordance to an embodiment of the present invention.

123 pertaining to the video content item 122 itself as well as data 124-125 pertaining to one or more promoted objects. The data 123 typically includes;

AV data in a format suitable to be played back on the electronic device 110;

a video content item identifier; and additional metadata relevant to the video content item 122. These metadata may comprise, for example, but not limited to, the total number of promoted objects appearing in the AV data, a maximum and/or minimum number of promoted objects to display at the time when the graphical timeline is generated and/or browsed (e.g. zoomed-in, zoomed-out, etc.), rules specifying how to display the promoted objects in the graphical timeline (e.g. when several promoted objects appear in the same video scene—a video scene typically corresponding to a part of a video content item in which a particular action or activity occurs), etc. The data 124-125 typically includes for each of the one or more promoted objects:

an object identifier such as for example, but not limited to, a name, a brand, a logo, a design, a picture, a title, etc.;

spatial and temporal positions of the object. It will be appreciated that in a theatrical representation such as a movie or a television program, an object may be present and visible in one or more video scenes for a certain duration. For example, the object may be a suit or a jacket worn by a character (as illustrated in FIGS. 3A and 3B) and may be appearing for the whole duration of the video scene. In such a case, the spatial position where the jacket or suit appears in the video frame of the AV data at time $t_1$ is recorded and stored in the database 121. This process is reiterated for some or all video frames where the jacket or suit appears;

object metadata relevant to one object. This metadata may comprise for example, but not limited to: an image, a picture, a video frame extracted from the AV data, etc. showing the object; a time reference typically corresponding to the time when the object is appearing (i.e. a time elapsed since the beginning of the video content item); an object description; a price; a store location; a layout; a link pointing to a network address where the object may be purchased online; etc.

While an event is being displayed on the display device 150, the electronic device 110 may query the database 121 and receive in response AV data as well as some or all of the metadata described hereinabove. The AV data can therefore be played back on the electronic device 110 and some of the retrieved metadata are used to identify the different promoted objects in the AV data.

Reference is now made to FIGS. 3A and 3B, which are pictorial illustrations showing how a video content item is prepared prior to being stored in the database in accordance to an embodiment of the present invention.

Prior to being stored into the database 121, the AV data of a video content item is manually processed by an operator of the television platform and/or operator 171 or third party 172. The work of the operator typically involves analyzing the AV data to identify all the promoted objects appearing in the different video scenes of the video content item. Upon identification of a promoted object appearing in a video scene, the operator 170 tracks and records its spatial and temporal positions.

FIG. 3A depicts a video frame showing a character wearing a suit. This video frame typically corresponds to a first video frame being displayed at time $t_1$ of a video scene of a video content item 122. The operator 170 analyzes the video frame and identifies the object to promote (e.g. the suit). Then, the operator 170 defines a zone where the suit appears on the video frame. Defining a zone may be achieved in many different ways such as, for example, but not limited to:

specifying a plurality of points on the video frame having spatial coordinates $[(x_1; y_1); \ldots ; (x_n; y_n)]$; or specifying a reference point on the video frame having spatial coordinates $(x_1; y_1)$ and then dimensions for the zone.

Additionally, the operator 170 may define additional zones for the promoted objects. These additional zones are typically useful for displaying visual indications associated with the promoted objects. In some cases (e.g. when a promoted object is small, when a plurality of promoted objects is appearing and/or overlapping on a same video frame, etc.), it will be convenient to define additional zones where the visual indications can be displayed. FIG. 3B depicts a second video frame belonging to the same video scene and appearing at time $t_2$. It is apparent that the character has moved and is now positioned further on the left of the video frame. Again, the operator analyzes the video frames and defines a zone where the suit is now located (and/or an additional zone). This process is reiterated for some or all video frames (displayed at times $[t_3; \ldots ; t_k]$) of the video scene in which the suit is visible. Once all the promoted objects have been identified, the spatial and temporal coordinates are associated with their relevant promoted object and stored in the database 121.

The operator may use any type of devices to manually process the video content items such as a laptop, tablet or personal computer, a handheld device, etc. connected to any type of input devices such as such as a keyboard, a pointing device (e.g. mouse, trackball, pointing stick, etc.), a remote control unit or even a touchscreen device. The video content items are typically processed prior to being stored in the database 121 along with their associated metadata. However, the operator may be able to update the video content items 122 at any time. In a situation where a new object is to be promoted, the operator processes the video content item to identify and to mark the new object. Once done, the video content item 122 as well as its associated metadata may be replaced or updated to include the new object.

Additionally and/or alternatively, the video content item 122 processing may benefit from a crowd sourced technology. Instead of having only one or more operators manually processing the video content items 122, an object tracking application may be made available to individual users through application stores (e.g. Android play store, Apple app store, Microsoft app store, etc.). This object tracking application typically enables an individual user to playback the AV data of a video content item 122 on his personal touchscreen device and then, to track the spatial and temporal positions of different objects. Therefore, spatial and temporal positions for additional objects and/or additional video content items may be collected via the object tracking application and used to enrich the database 121.

Figure 4:
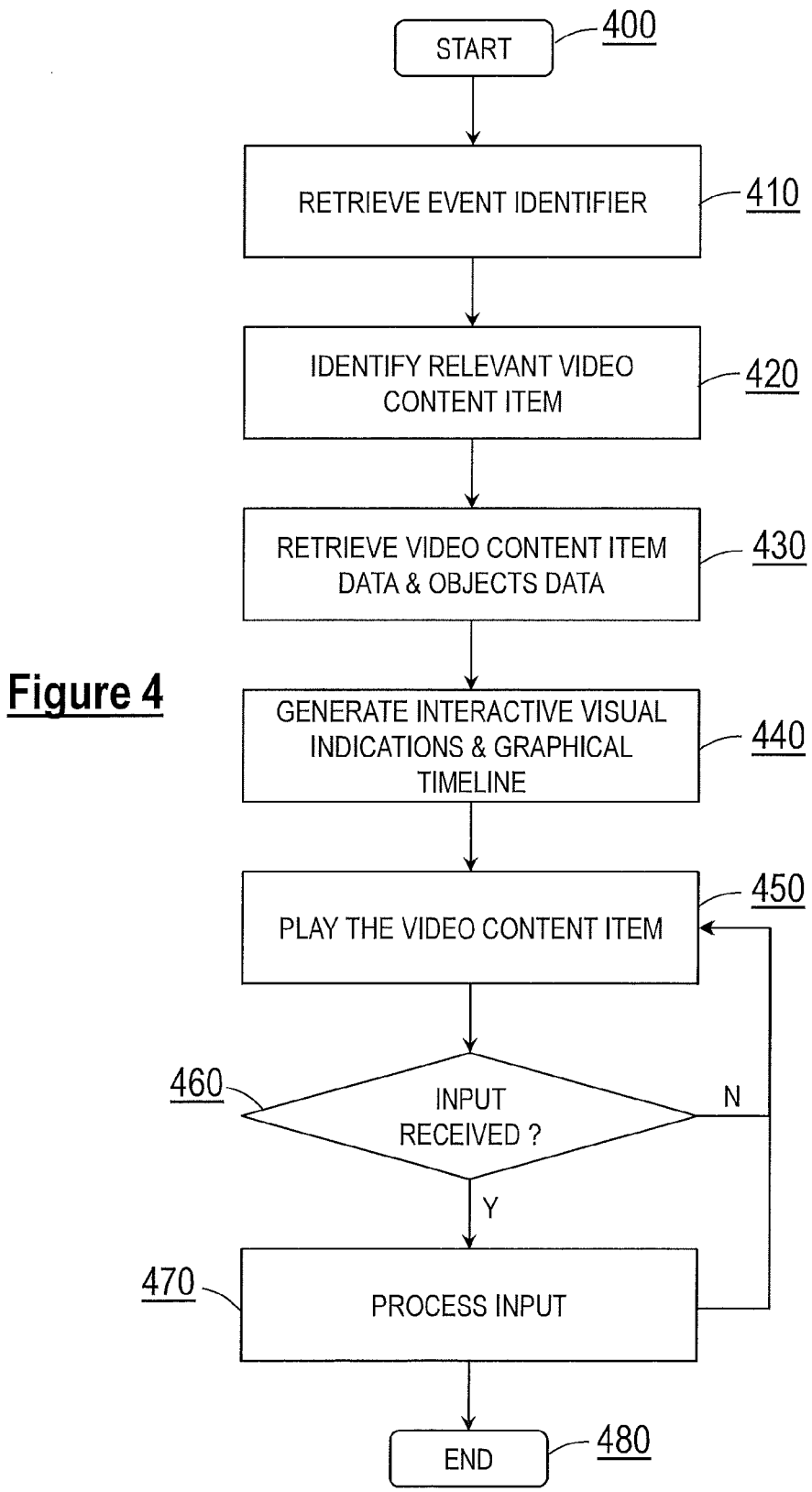
FIG. 4 is a flow chart diagram of a method of operating an electronic device constructed and operative in accordance with an embodiment of the present invention.

Reference is now made to FIG. 4, which is a flow chart diagram of a method of operating the electronic device constructed and operative in accordance with an embodiment of the present invention.

At start (step 400), a user decides to run an application to obtain detailed information related to promoted objects appearing in an event/service currently being displayed on the display device 150.

At step 410, the application is typically executed locally on the electronic device 110 and first outputs a request that is sent to the client device 130. The communications unit 116 of the electronic device 110 typically outputs a request to retrieve the event identifier (event_id) of the event/service currently being displayed on the display device 150. Those skilled in the art will appreciate that the event_id may also be transmitted automatically to the electronic device 110 under certain circumstances. In a situation where the user buys a VOD asset or launches a recording and that the application is already being run on the electronic device 110, the client device 130 is able to communicate the event_id automatically to the electronic device 110.

At step 420, the communications unit 116 of the electronic device 110 receives the event_id corresponding to the event currently being displayed on the display device 150 and uses it to query the database 121. The event_id is used to identify the corresponding video content item 122 in the database 121 by comparing it to the different video content item identifiers included in the data 123. Once the corresponding video item 122 is identified as being the one currently being displayed on the display device 150, some or all of the data 123 related to the video content item (i.e. AV data and video content item metadata) and some or all of the data 124-125 related to the different promoted objects (i.e. object identifier, object spatial and temporal positions and object metadata) are transmitted to the electronic device 110.

At step 430, the data 123 and 124-125 relevant to the event currently being displayed on the display device 150 are received by the communications unit 116 and are stored in the memories 113-114 under the control of the processor 115.

At step 440, the processor 115 is able to retrieve the data 124-125 relevant to the different promoted objects to generate interactive visual indications that are to be displayed on top of the AV data during playback. Each of these interactive visual indications allows a user to access detailed information relevant to a particular promoted object appearing in the AV data. Also, the processor 115 is able to generate a description page for each of the promoted objects. A description page is typically associated with one or more visual indications and presents detailed information about a promoted object. The description page of a particular object is generated using the object metadata for the relevant object (e.g. layout, price, store location, etc.) and is accessed when a user selects or activates an interactive visual indication associated with the particular object.

The processor 115 is further operable to generate a graphical timeline representation of the video content item 122 that can be displayed and accessed at any time during playback. The graphical timeline is built using the video content item metadata, the objects identifiers and objects metadata. The graphical timeline includes all the promoted objects of a particular video content item 122, each of them being placed at a particular temporal position on the timeline. Visual indications are also provided for each of the promoted object as well as thumbnails for the video scene in which the object appears. Those skilled in the art will appreciate that the visual indications for the promoted objects may be the same as the ones described hereinabove or different ones. In any case, these visual indications are interactive and also allow the user to access the generated description pages. Furthermore, the thumbnails provided for the video scenes are also interactive and typically allow a user to playback the video scene. In other words, when a user selects and/or clicks on a thumbnail associated with a particular video scene, the playback of the AV data is resumed from the beginning of this particular video scene. In a situation where the graphical timeline is generated remotely and received as part of the data 123 and 124-125, the processor 115 is also operable to retrieve the graphical timeline from one the memories 113-114 for display.

At step 450, the video player 112 of the electronic device 110 retrieves the AV data from one of the memories 113-114 and plays it back. Whenever a promoted object appears in the AV data, an interactive visual indication is displayed on top of the AV data. While the AV data is being played back and displayed on the rendering screen 111 of the electronic device 110, the communications unit 116 waits for an incoming request and/or input (step 460).

If no input is received at the communications unit 116, the AV data continues to be played back. As soon as an input is received, it is processed by the electronic device 110 at step 470. The input may be a request received from a user to: access or hide detailed information about a promoted object; restart the playback of the AV data from a particular video scene; show or hide the graphical timeline; browse the graphical timeline; adjust the zoom factor; etc. Depending on the context and the type of input received, the processor 115 of the electronic device 110 is able to identify the request and process it. Typically, a relevant set of instructions associated with the identified input is retrieved from one of the memories 113-114 and executed by the processor 115.

The process ends at step 480 when the AV data has been played back entirely or when the user has turned off the application and/or the electronic device 110.

Reference is now made to FIGS. 5A to 5D, which are pictorial illustrations showing how the AV data is played back on the electronic device with interactive visual indications for the promoted objects in accordance with an embodiment of the present invention.

Figure 5A:
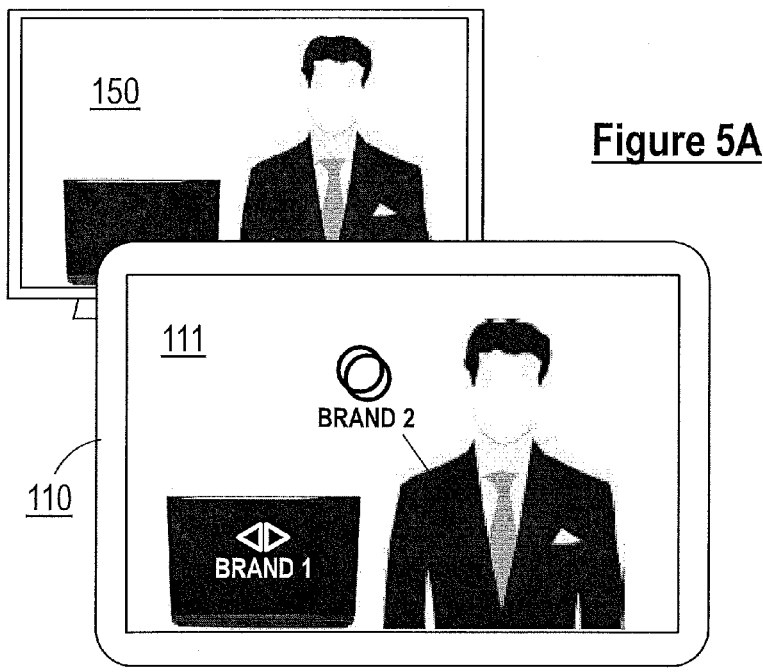
FIGS. 5A to 5D are pictorial illustrations showing how the audio video (AV) data is played back on an electronic device with interactive visual indications for the promoted objects in accordance with an embodiment of the present invention.

FIG. 5A shows the display device 150 currently displaying an event and/or service. FIG. 5A also shows the electronic device 110 where the application has been launched and the AV data of the video content item corresponding to the event currently being displayed on the display device 150 is being played back. Interactive visual indications are also provided for two different promoted objects i.e. a laptop computer and a suit appearing in the current video scene. Displaying the interactive visual indications on top of the AV data typically involves displaying the object identifier (i.e. brand and logo in the example shown in FIG. 5A) in the zone specified by the spatial coordinates at a particular time. These spatial coordinates may correspond to the zones or additional zones defined for the promoted objects. For example:

at $t_1$ the brand and logo are displayed in the zone defined by the spatial coordinates $[(x_1; y_1); \ldots; (x_n; Y_n)]$;

at $t_2$ the brand and logo are displayed in the zone defined by the spatial coordinates $[(x_2; y_2); \ldots; (x_m; y_m)]$; etc.

The display of the interactive visual indications is managed and controlled by the processor 115. The processor 115 is also able to solve issues that may arise when different zones defined for different objects overlap. The visual indication interactivity is provided by associating one or more generated description pages and a set of instructions to the visual indication. The set of instructions associated with the visual indication typically comprises instructions defining which description page to display upon receiving a user's input selecting an interactive visual indication and/or the relationships between different description pages associated with the same interactive visual indication/object.

Figure 5B:
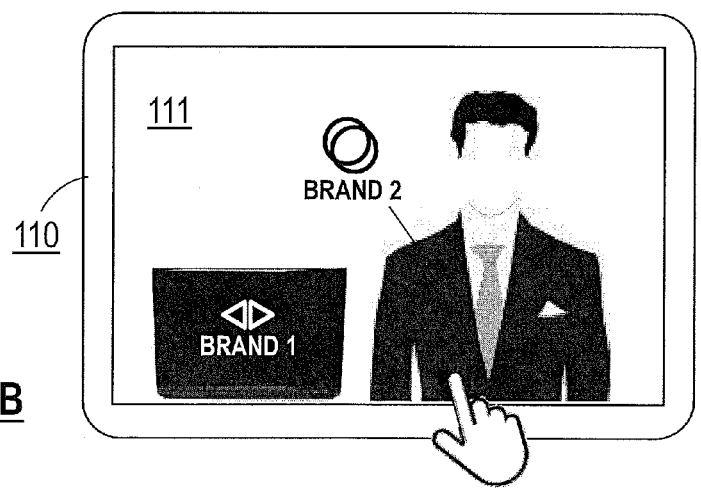

FIG. 5B shows a user selecting an interactive visual indication by touching the rendering screen 111 of the electronic device 110. Typically, the user wants to access more information on a particular promoted object (e.g. suit) and therefore, touches the zone on the rendering screen 111 where the interactive visual indication is displayed. Once the input has been detected by the electronic device 110, it is passed to the processor 115 for further processing. To process the input, the processor 115 determines which interactive visual indication has been selected by the user. This is achieved by identifying the point (i.e. the spatial coordinates) on the rendering screen 111 of the electronic device 110 touched by the user and comparing it with the zones defined for the different promoted objects. Then, when the processor has identified the interactive visual indication and therefore the relevant promoted object, an associated generated description page is displayed on top of the AV data.

Figure 5C:
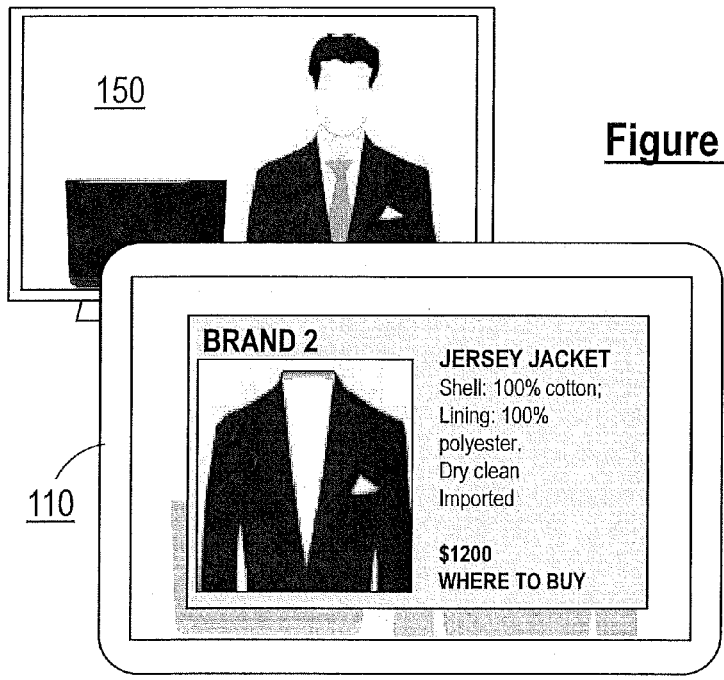

FIG. 5C shows a first illustrative description page relevant to the suit. The description page has been generated in advance by the processor 115 using the object metadata and is therefore ready to be displayed as soon as the user touches the corresponding interactive visual indication. This description page comprises the brand, a picture of the suit, a description, a price and a link pointing to further information on the suit. The link may point to a network address where the suit may be purchased online, or to a map locating one or more stores where the suit is sold, or even to another description page associated with the suit as shown in FIG. 5D.

Figure 5D:
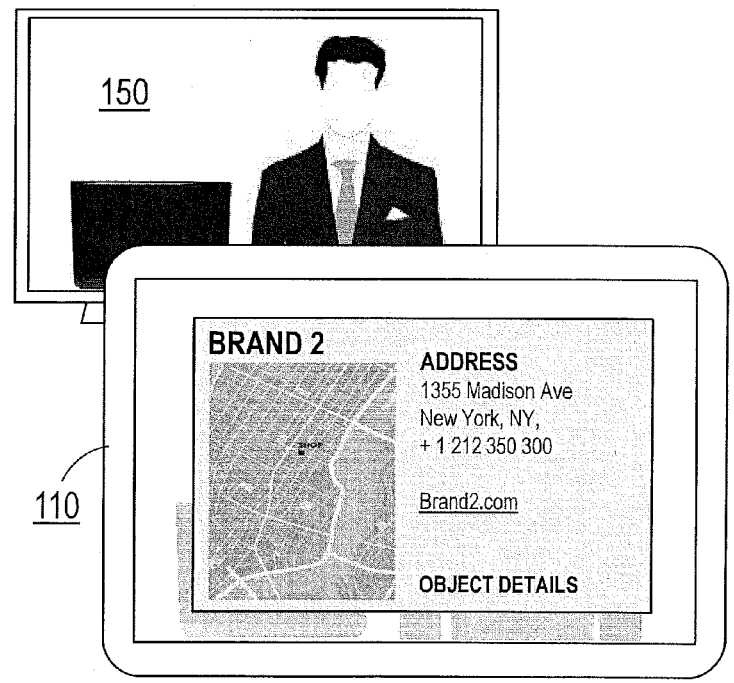

FIG. 5D shows a second illustrative description page relevant to the suit. This description page shows the brand, an address for a store selling the suit, a map locating a store and a link pointing to further information on the suit. Again, the link may point to a network address where the suit may be purchased online, or to a map locating another store where the suit is sold, or even to the description page shown in FIG. 5C or another description page associated with the suit. Those skilled in the art will appreciate that these two description pages are given for illustration purposes only and that the information displayed on these description pages are not limited to what is shown. Also, upon selecting the interactive visual indication corresponding to the suit, displaying the first, the second or both pages is merely a question of design as it is apparent that both of them may be displayed. Furthermore, in another embodiment of the present invention, a description page may be generated by the processor 115 only at the time when it is requested for display thereby reducing the processing workload at the time when the application is launched. Alternatively and/or additionally, some or all of the description pages may be generated remotely (e.g. at the head end side) and merely transmitted to the electronic device 110 when needed i.e. as part of the data 123 and 124-125 when the application is launched or at the time when it is requested for display.

Figures 6A, 6B:
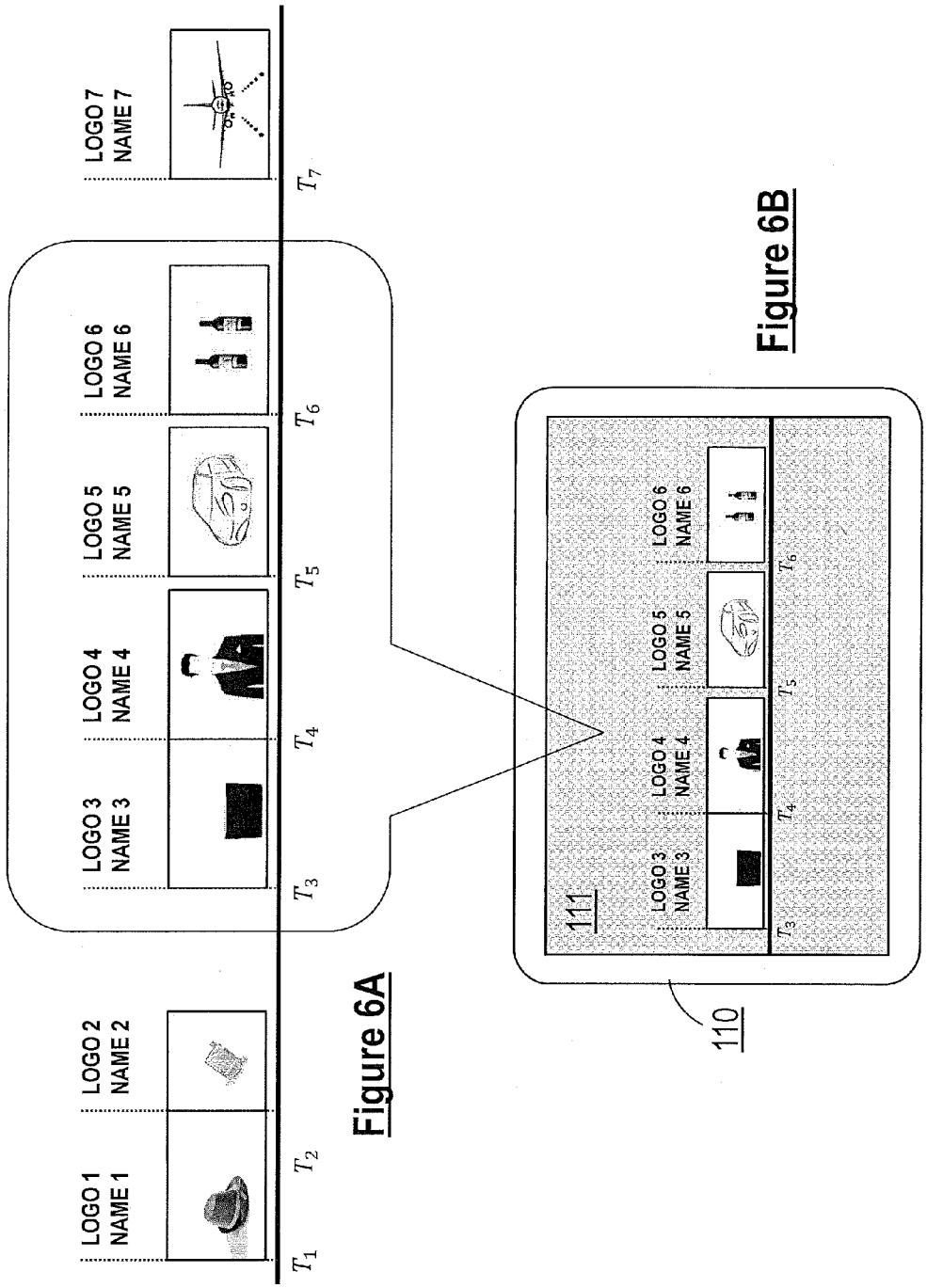
FIGS. 6A and 6B are pictorial illustrations of a graphical timeline of a video content item in accordance with an embodiment of the present invention.

Reference is now made to FIGS. 6A and 6B, which are pictorial illustrations of a graphical timeline of a video content item in accordance with an embodiment of the present invention.

The graphical timeline is built using the video content item metadata, the objects identifiers and the objects metadata. The graphical timeline of FIG. 6A shows all the promoted objects appearing in the video content item. For each one of the promoted objects, an interactive visual indication and an interactive thumbnail is provided.

FIG. 6A shows a first promoted object appearing in a first interactive thumbnail. The thumbnail is typically retrieved from the first object metadata and typically corresponds to a video frame extracted from a video scene of the AV data in which the first object appears. Displaying such a video frame enables the user to easily identify the first object as well as the video scene. Alternatively, the thumbnail may be a still picture or any type of image as long as the first object is visible. The thumbnail interactivity is provided by associating a time reference and a set of instructions with the thumbnail. The time reference may be provided as part of the first object metadata and typically corresponds to the beginning of the video scene in which the first object appears. In other words, the time reference corresponds to the time elapsed since the beginning of the video content item when the video scene, comprising the first object, starts. Additionally and/or alternatively, one of the temporal positions for the first object may be retrieved and used as the time reference. In this case, the time reference corresponds to the time at which the first video frame showing the first object appears. The set of instructions associated with the thumbnail typically comprises instructions for the video player 112 to resume playback of the AV data from the time reference. Therefore, the processor 115 is able to retrieve the relevant set of instructions and associate it with the first object thumbnail at the time when the graphical timeline is generated. As a result, in response to a user's input, that is selecting a thumbnail, the processor 115 sends instructions to the video player 112 to resume playback of the AV data from the time reference.

FIG. 6A also shows a first interactive visual indication being displayed above the interactive thumbnail. The first interactive visual indication corresponds to the object identifier (i.e. brand and logo) and is typically similar to the one displayed on top of the AV data as explained in relation to the description of FIG. 5A. The visual indication interactivity is provided by associating one or more generated description pages and a set of instructions to the visual indication. The set of instructions associated with the visual indication typically comprises instructions defining which description page to display upon receiving a user's input selecting an interactive visual indication and/or the relationships between different description pages associated with the same interactive visual indication/object. As a result, in response to a user's input selecting an interactive visual indication displayed as part of the graphical timeline, the processor 115 retrieves the associated relevant set of instructions from one of the memories 113-114 and executes it. In turn, a description page related to the first object can be displayed.

Finally, the time reference and/or the temporal position of the first object are used to position the interactive visual indication as well as the interactive thumbnail on the timeline. This process is reiterated for each promoted object belonging to the video content item. At the end of the process, the graphical timeline showing all the promoted objects—with their interactive visual indication and interactive thumbnail positioned at their time references—can be displayed and accessed.

FIG. 6B shows how the graphical timeline is displayed on the rendering screen 111 of the electronic device 110. Once generated by the processor 115 or generated remotely, received and retrieved from one of the memories 113-114 by the processor 115, the graphical timeline can be displayed on the electronic device 110 at any time. A user watching the AV data played back on his electronic device 110 may request the display of the graphical timeline either by using a remote control unit or touching the touch sensitive rendering screen 111. To determine how to display the graphical timeline, the processor 115 extracts the maximum number of promoted objects to display as well as the total number of promoted objects of the video content item from the additional metadata relevant to the video content item 122 (i.e. provided as part of the data 123). In a situation where the total number of promoted objects of the video content item is less than the maximum number of promoted objects to display, then all the promoted objects—i.e. interactive visual indications and thumbnails—will be displayed. Consequently, the entire graphical timeline is displayed on the rendering screen 111 of the electronic device 110. On the other hand, if the maximum number of promoted objects to display is less than the total number of promoted objects of the video content item, then a subset of the graphical timeline is displayed on the rendering screen 111 of the electronic device 110. The processor 115 adjusts the zoom factor of the electronic device 110 so that the subset of the graphical timeline displayed comprises a number of promoted objects corresponding to the maximum number of promoted objects to display. Displaying such a subset of the graphical timeline gives the user a better viewing experience by ensuring that the interactive visual indications and thumbnails will be visible and usable. The user may also change this maximum number at any time by accessing the settings menu of the application.

Additionally and/or alternatively, the processor 115 is able to determine the current AV data playing time at which the user requested the display of the graphical timeline (e.g. a time elapsed since the start time of the playing of the AV data) and/or at which the graphical timeline is to be displayed and uses it to adjust the display of the graphical timeline. Adjusting the display may comprise, for example, but not limited to, centering the (subset of the) graphical timeline on the rendering screen 111 of the electronic device 110 on the time at which the user requested the display of the graphical timeline; centering the (subset of the) graphical timeline on the rendering screen 111 of the electronic device 110 on the interactive thumbnail and/or the interactive visual indication associated with a time reference and/or temporal position the closest from the time at which the user requested the display of the graphical timeline; etc. Furthermore, those skilled in the art will appreciate that the (subset of the) graphical timeline may also be displayed automatically when the application is launched and as soon as it is generated by the processor 115. In both cases, the (subset of the) graphical timeline is displayed while the AV data continues to be played back in the background (not shown in FIG. 6B).

Figure 7A:
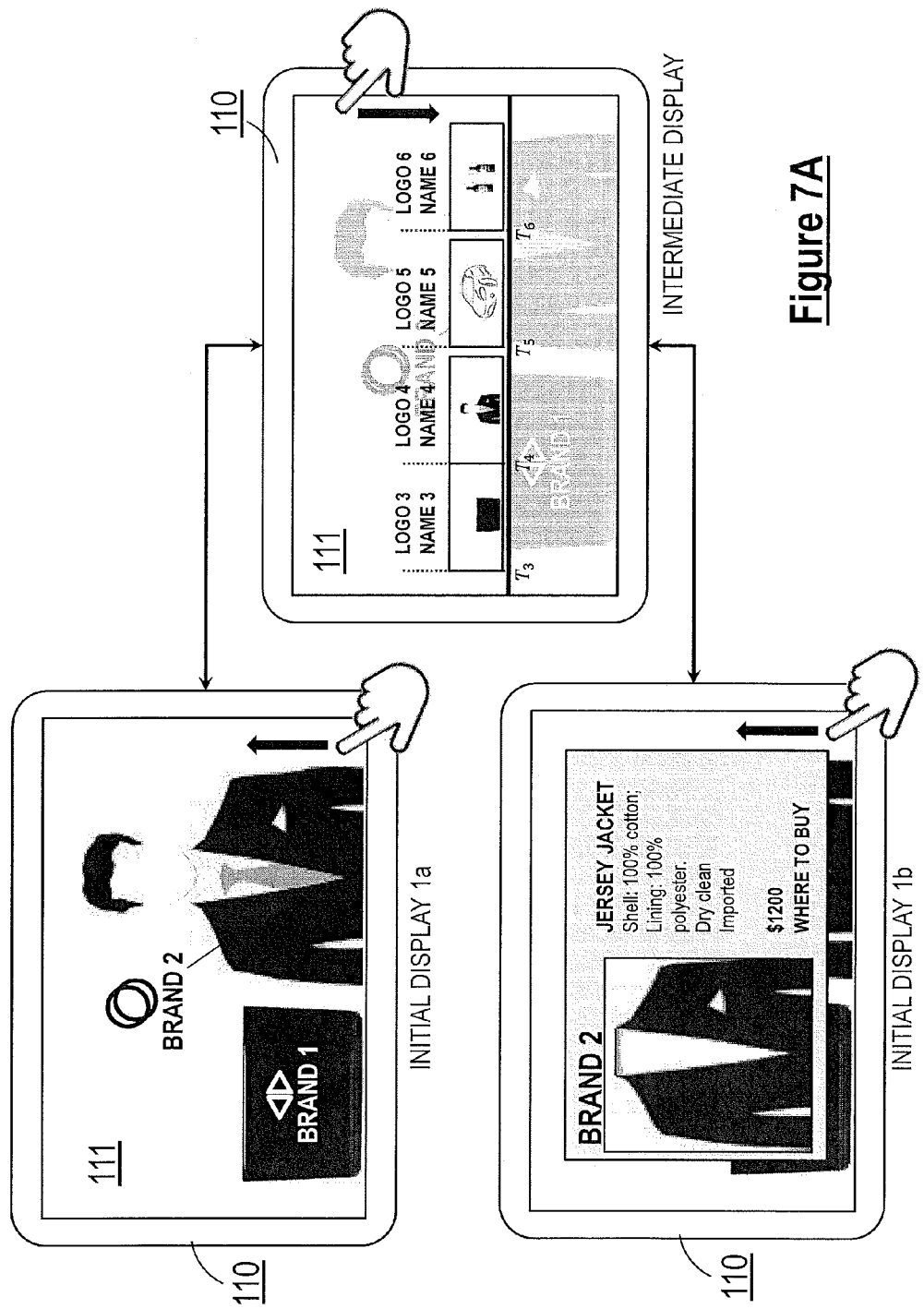
FIGS. 7A to 7C are pictorial illustrations showing how the graphical timeline can be operated using a touch sensitive device.
Figure 7B:
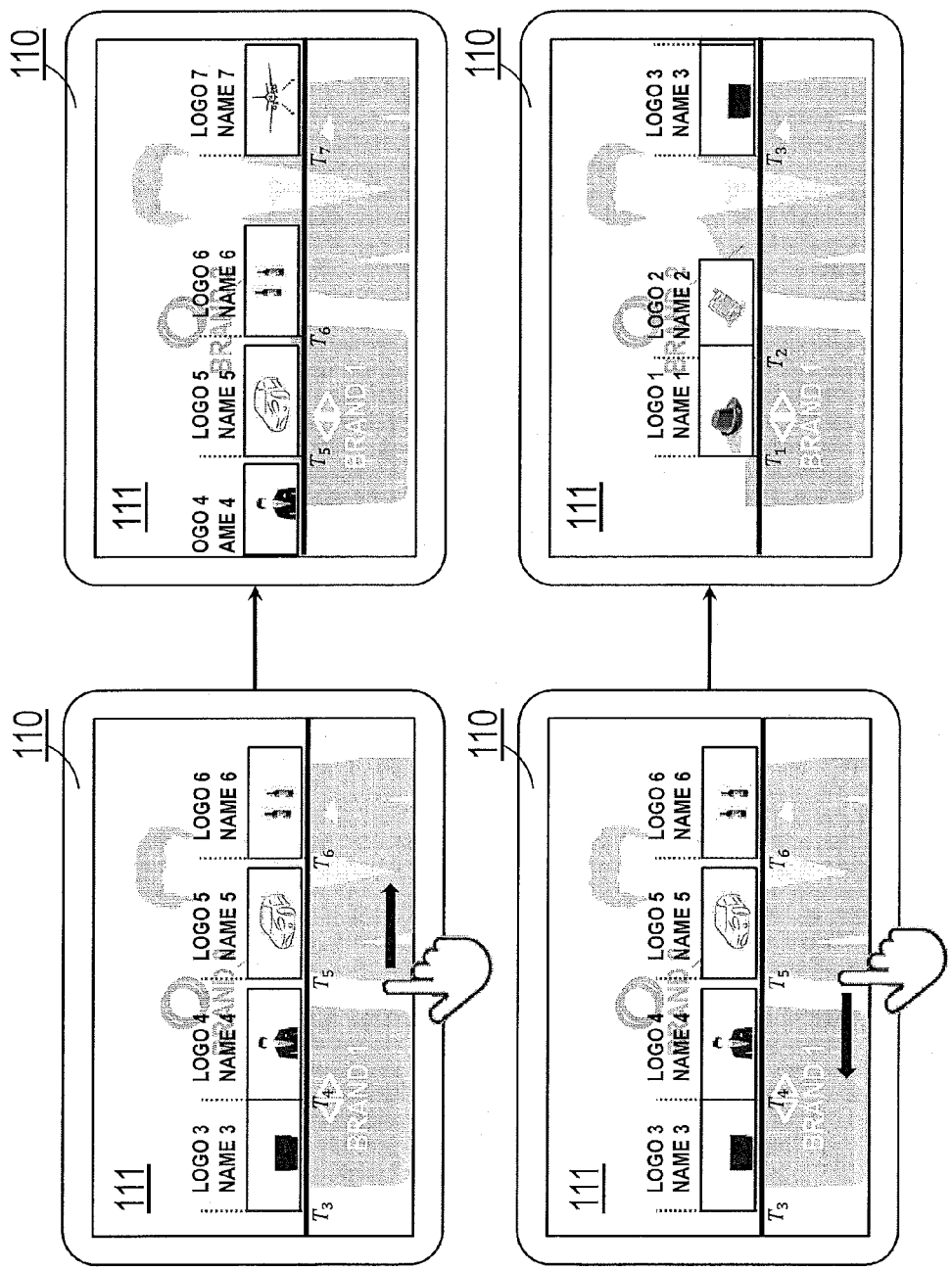
Figure 7C:
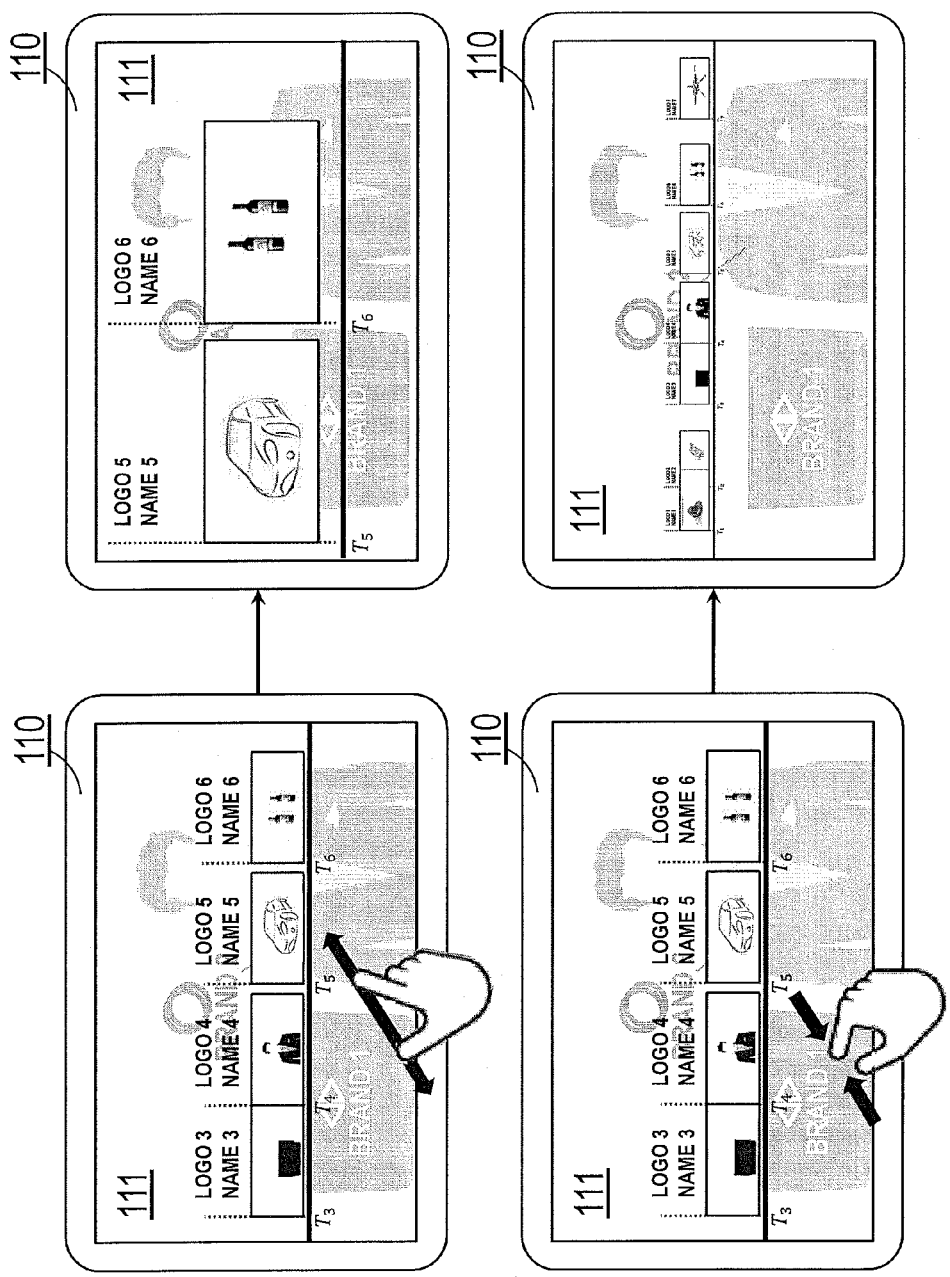

Reference is now made to FIGS. 7A to 7C, which are pictorial illustrations showing how the graphical timeline can be operated using a touch sensitive device.

The application may define different types of user interface (UI) gestures that can be used to launch, navigate, browse, etc. the graphical timeline. A UI gesture dictionary and/or table may be installed as part of the application and stored in one of the memories 113-114 with associated functions. Then, upon detection of a UI gesture being applied on the rendering screen 111 of the electronic device 110, the processor 115 is able to interpret the UI gesture and process it. To do so, the processor 115 first identifies the UI gesture by dictionary and/or table look-up; then, retrieves a set of instructions stored in one of the memories 113-114 associated with the UI gesture and executes it.

A variety of functions may be invoked using the different UI gestures. FIG. 7A shows two different displays of the application rendered on the rendering screen 111 of the electronic device 110. Initial display 1a shows the AV data being played back along with visual indications for the promoted objects. Initial display 1b shows a description page being displayed in response to a user's input selecting an interactive visual indication. In both situations, an upward swipe UI gesture will be interpreted by the application (i.e. the processor 115) as an instruction to show the graphical timeline. As a result, the graphical timeline is shown as illustrated in the intermediate display of FIG. 7A. Finally, a downward swipe UI gesture applied on the graphical timeline at this stage will be interpreted as an instruction to hide the graphical timeline. As a result the graphical timeline disappears and the initial display is shown again i.e. the description page and/or the AV data.

FIG. 7B illustrates the functions associated with the leftward and rightward swipe UI gestures. When applied on the graphical timeline, a rightward swipe UI gesture (respectively a leftward swipe UI gesture) is interpreted as an instruction to display the interactive visual indications and interactive thumbnails positioned on the left side (respectively one the right side) of the graphical timeline. In other words, interactive visual indications and interactive thumbnails associated with time references and/or temporal positions earlier (respectively later) than the time references and/or temporal positions associated with the interactive visual indications and interactive thumbnails currently being shown on the rendering screen 111 of the electronic device 110 will be displayed. These UI gestures are typically used for navigating/browsing the graphical timeline.

FIG. 7C illustrates the functions associated with pinch-in/-out UI gestures. When applied to the graphical timeline, a pinch-in UI gesture (and, respectively, a pinch-out UI gesture) is interpreted as an instruction to zoom-in (and, respectively, zoom-out) the graphical timeline. These UI gestures are typically used for adjusting the zooming factor used for displaying the graphical timeline.

A pinch-in UI gesture is interpreted by the processor 115 as an instruction to diminish the zoom factor. As a result, more promoted objects—i.e. interactive visual indications and interactive thumbnails—may be displayed and visible on the rendering screen 111 of the electronic device 110. However, it will be apparent to those skilled in the art that diminishing the zoom factor may render the graphical timeline illegible. It may lead to situations where too many promoted objects have to be positioned at the same or at a similar place on the graphical timeline. In an embodiment of the present invention, the processor 115 is able to use the additional metadata relevant to the video content item 122 to solve this issue. The processor 115 typically retrieves and applies a rule specifying how to display the promoted objects. These rules may specify, for example, but without limiting the generality of the invention, that:

priority may be given to the promoted object having the earliest (or the latest) time reference and/or temporal position;

priority may be given to a predetermined promoted object. This determination may be made by the TV broadcast and/or platform operator or by a third party entity, etc.;

priority may be given to the promoted object appearing the most often in the video content item; or no priority may be given but instead a further single visual indication should be positioned on the graphical timeline. This further single visual indication may typically be a blank image with a number indicating the number of promoted objects hidden behind the blank image.

Finally, the zoom factor may be diminished until a certain threshold is reached. This threshold typically corresponds to a minimal zoom factor value for which all the promoted objects of the video content item appear on the graphical timeline.

A pinch-out UI gesture is interpreted by the processor 115 as an instruction to increase the zoom factor. As a result, less promoted object—i.e. interactive visual indications and interactive thumbnails—are displayed and visible on the rendering screen 111 of the electronic device 110. The zoom factor may be increased until a certain threshold is reached. This threshold typically corresponds to a maximal zoom factor value for which at least one of the promoted objects of the video content item 122 appears on the graphical timeline. Alternatively, this threshold may be set to the minimum number of promoted objects to display provided as part of the video content item additional metadata.

It will be appreciated by persons skilled in the art that the present invention is not limited to the particular UI gestures described hereinabove. For example, a double tap may be used instead of the pinch-in/-out UI gesture for zooming-in/-out. It will be apparent to those skilled in the art that other UI gestures and associated functions may be implemented and applied onto the graphical timeline.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

Also, it will be appreciated by persons skilled in the art that the present invention is not limited to what has been particularly shown and described hereinabove. Rather the scope of the invention is defined by the appended claims and equivalents thereof.

What is claimed is:

1. A method implemented on a computing device, the method comprising:
   querying a database for data related to a video content item currently being displayed on a display device, said video content item comprising at least one video scene;
   receiving said data upon identifying said video content item in said database, said data comprising metadata relevant to one or more promoted objects appearing in said at least one video scene and a maximum number of promoted objects to display;
   generating a graphical timeline of said video content item using said metadata, wherein said graphical timeline comprises an interactive visual indication and an interactive thumbnail for each of said one or more promoted objects appearing in said at least one of video scene, said interactive visual indication identifying a particular promoted object from said one or more promoted objects and said interactive thumbnail identifying a video scene of said video content item in which said particular promoted object appears; and
   displaying said generated graphical timeline of said video content item, said graphical timeline being displayed by adjusting a zoom factor value of said display device so that said maximum number of promoted objects can be displayed on said display device.

2. The method of claim 1, wherein said video content item is being displayed on a first display device and said graphical timeline is being displayed on a second display device.

3. The method of claim 1, further comprising:
   receiving a request to display a description page, said request corresponding to a user's input selecting an interactive visual indication corresponding to a particular promoted object, and wherein said description page is generated using said metadata and comprises detailed information related to said particular promoted object; and
   displaying said description page for said particular promoted object in response to said received request.

4. The method of claim 1, further comprising:
   receiving a request to display a video scene, said request corresponding to a user's input selecting an interactive thumbnail corresponding to a particular promoted object;
   retrieving a time reference associated with said interactive thumbnail, said time reference identifying said video scene of said video content item in which said particular promoted object appears; and
   playing said video content item from said time reference in response to said received request.

5. The method of claim 4, wherein said time reference is a time corresponding to a beginning of a video scene in which said particular promoted object appears.

6. The method of claim 4, wherein said time reference is a time corresponding to a video frame of a video scene in which said particular promoted object first appears.

7. The method of claim 1, wherein said received data further comprises:
   a total number of promoted objects for said identified video content item; and
   said displaying comprises displaying a subset of said graphical timeline if said maximum number of promoted objects is less than said total number of promoted objects, said subset of said graphical timeline being displayed by adjusting a zoom factor value of said display device so that said maximum number of promoted objects are displayed on said display device.

8. The method of claim 7, wherein said displaying a subset further comprises:
   determining a video content item current playing time, said current playing time corresponding to a time at which said subset of said graphical timeline is to be displayed on said display device;
   centering said subset of said graphical timeline on said display device using said determined current playing time; and
   displaying said subset of said generated graphical timeline on said display device.

9. The method of claim 8, wherein said centering comprises centering said subset of said graphical timeline on said determined current playing time; or centering said subset of said graphical timeline on a time reference associated with an interactive visual indication and/or an interactive thumbnail the closest from said determined current playing time.

10. The method of claim 7, further comprising:
    receiving a user's input applying a further user interface gesture on said display device; and
    displaying a new subset of said graphical timeline in response to said received user's input.

11. The method of claim 10, wherein said displaying a new subset comprises displaying one or more interactive visual indications and interactive thumbnails associated with time references earlier than time references associated with interactive visual indications and interactive thumbnails displayed as said subset of said graphical timeline.

12. The method of claim 10, wherein said displaying a new subset comprises displaying one or more interactive visual indications and interactive thumbnails associated with time references later than time references associated with interactive visual indications and interactive thumbnails displayed as said subset of said graphical timeline.

13. The method of claim 10, wherein said displaying a new subset comprises diminishing said zoom factor value to display more interactive visual indications and interactive thumbnails of promoted objects as part of said graphical timeline on said display device.

14. The method of claim 10, wherein said displaying a new subset comprises increasing said zoom factor value to display less interactive visual indications and interactive thumbnails of promoted objects as part of said graphical timeline on said display device.

15. The method of claim 1, wherein said received data further comprises:

a total number of promoted objects for said identified video content item; and said displaying further comprises displaying said graphical timeline entirely on said display device if said total number of promoted objects is less than said maximum number of promoted objects.

16. The method of claim 1, further comprising:

stopping to display said graphical timeline on said display device upon receiving a user's input applying a user interface gesture on said display device.

17. A computing device comprising:

a display device operable to display a video content item, said video content item comprising at least one video scene;

a communications unit operable to query a database for data related to said video content item; and further operable to receive said data upon identifying said video content item in said database, said data comprising metadata relevant to one or more promoted objects appearing in said at least one of video scene and a maximum number of promoted objects to display;

a processor that is specially programmed to generate a graphical timeline of said video content item using said metadata, wherein said graphical timeline comprises an interactive visual indication and an interactive thumbnail for each of said one or more promoted objects appearing in said at least one video scene, said interactive visual indication identifying a particular promoted object from said one or more promoted objects and said interactive thumbnail identifying a video scene of said video content item in which said particular promoted object appears; and wherein said display device is further operable to display said generated graphical timeline of said video content item, said graphical timeline being displayed by adjusting a zoom factor value of said display device so that said maximum number of promoted objects can be displayed on said display device.

18. One or more non-transitory computer readable tangible storage media encoded with software comprising computer executable instructions and when the software is executed operable to:

query a database for data related to a video content item currently being displayed on a display device, said video content item comprising at least one video scene;

receive said data upon identifying said video content item in said database, said data comprising metadata relevant to one or more promoted objects appearing in said at least one video scene and a maximum number of promoted objects to display;

generate a graphical timeline of said video content item using said metadata, wherein said graphical timeline comprises an interactive visual indication and an interactive thumbnail for each of said one or more promoted objects appearing in said at least one video scene, said interactive visual indication identifying a particular promoted object from said one or more promoted objects and said interactive thumbnail identifying a video scene of said video content item in which said particular promoted object appears; and display said generated graphical timeline of said video content item, said graphical timeline being displayed by adjusting a zoom factor value of said display device so that said maximum number of promoted objects can be displayed on said display device.

\* \* \* \* \*